United States Patent Office 2,931,818
Patented Apr. 5, 1960

2,931,818

PROCESS OF TREATING LECITHIN FOR FREEING IT OF ITS DEPRESSOR FACTOR

Ernest B. McQuarrie, Oakland, and Hans P. Andersen, Berkeley, Calif., assignors to Cutter Laboratories, Berkeley, Calif., a corporation of California No Drawing. Application April 29, 1957
Serial No. 655,468

4 Claims. (Cl. 260—403)

This invention relates to and, in general, has for its object the provision of a method for purifying lecithin.

Lecithin has long been known as a fine emulsifying agent and, as such, appears as an ingredient in many foods. This emulsifying property might well be of great value in the preparation of certain parenteral medications if it were not for the fact that commercial lecithin contains an unknown substance which, on parenteral administration, has extreme vasodepressor effects.

The presence or absence of this depressor substance can be determined using the following standardized technique.

A mature cat is anesthetized with diallylbarbituric acid and urethane 0.7 cc. per kilo, intraperitoneally. The trachea, the left common carotid and the right external jugular vein are cannulated. Heparin in a dose of 10 mg. is used as an anticoagulant. The animal is connected to a mercury manometer and the blood pressure recorded on a slow drum. If the blood pressure is below 80 mm. Hg, the animal is discarded. If the blood pressure is higher than 80 mm. Hg, the animal is allowed to stabilize for a period of 20 minutes or until a satisfactory base line is established. Then a sample of the material to be used is injected intravenously and the blood pressure is observed for the next 15 minutes.

Invariably, when 1 cc. of a 5% emulsion of commercial lecithin or a similar concentration of an absolute alcohol extract of commercial lecithin is injected rapidly through the cannulated right external jugular vein, there is a sharp and immediate drop in blood pressure.

Although it is not yet clearly determined what, if any, effect the presence of this depressor factor might have in human intravenous therapy, its occurrence precludes the use of products containing it in human therapy for the reason that such products could not pass adequate animal safety tests which must be applied before releasing the material for human clinical testing.

More particularly then, the object of this invention is the provision of a process of treating lecithin to free it of its depressor factor.

One of the objects of this invention is to provide a new and novel method of removing this unknown depressor substance from commercial lecithin preparations.

Other valuable objects will appear to those skilled in the art from the description of the method and the claims which follow.

In carrying out our process, we have found it advantageous to remove certain insoluble materials from commercial lecithin as a preliminary step.

For instance, one volume of lecithin can be dissolved in 2.5 volumes of ether and filtered in the presence of 1% (w./v.) of a filter aid such as diatomaceous earth or kieselguhr added, this product being readily obtainable under the trade name of Celite. After filtration, the residue can be discarded and the filtrate treated by adding two volumes of acetone. After vigorous stirring, the precipitate can be removed and air dried to eliminate the solvents.

This precipitate (Fraction I), on testing, is found to contain all the depressor substance present in the original material.

Starting then with the above identified Fraction I, we extract 2 kg. with several volumes of a short-chain (methyl, ethyl, propyl or butyl) aliphatic alcohol containing no more than 10% water. Preferentially, we have used absolute ethanol. After thorough extraction (thirty minutes with stirring), the undissolved material is filtered off. This residue may be advantageously re-extracted twice more with the same volume of solvent. The filtrates are combined as Fraction II solution.

We then prepare a batch of approximately one kg. of an anion-exchange resin in the free base form, by, for instance, passing the resin through several regeneration and exhaustion cycles with aqueous alkali and acid solutions, finally regenerating with aqueous alkali, washing out the alkali solution with distilled water, drying the resin and grinding to an appropriate size.

The dry, ground resin is then added to the alcoholic lecithin solution (Fraction II) on a batch basis or the resin can be prepared in a column and the Fraction II solution passed through the resin.

The effluent from the resin treatment is then evaporated to dryness to remove the solvent. The dry product (Fraction III) is found to have the emulsifying properties of the original lecithin, and is free of the depressor substance which had contaminated the commercial product.

It is noteworthy that if one uses an aqueous solution of lecithin, the resin treatment is ineffectual in removing the depressor substance. Absolute alcohol solutions are the most efficient solutions from which to remove the depressor substance. As water is added to the alcohol solutions, the efficiency decreases, until the process is no longer satisfactory when a concentration of water greater than 10% is reached.

In practicing the invention, a number of anion exchange resins have been used, as, for example, Amberlite 1R–4B (Rohm and Haas), Duolites A–2, A–2M, A–7, A–40 and A–114 (Chemical Process Co., Redwood City, California), Ionac A–300 (American Cyanamid) and De-Acidite (Permutit Co.). All remove the depressor substance when used under the conditions outlined. We have found Duolite A–2M, a tertiary amine ion exchanger, to be the resin of choice because of its high capacity for removing the depressor substance.

The particle size of the ion exchanger can be varied over a wide range, the more finely ground material having a greater initial capacity but also tending to slow down the flow rate towards the end of the operation where a column is being used.

Since temperatures are not critical, our process can be readily carried out at room temperature.

We claim:

1. A method of purifying lecithin, comprising dissolving lecithin in a lower alkanol containing no more than 10% water and treating the resulting alcohol solution with an anion-exchange resin in the free base form thereby to remove the depressor content of the lecithin.

2. A method of purifying commercial lecithin, comprising dissolving lecithin in absolute ethanol and treating the resulting alcohol solution with an anion-exchange resin in the free base form thereby to remove the depressor content of the lecithin.

3. A method of purifying commercial lecithin, comprising dissolving the lecithin in a lower alkanol containing no more than 10% water and treating the resulting alcoholic solution with a tertiary amine anion-exchange resin in the free base form thereby to remove the depressor content of the lecithin from said solution.

4. A method of purifying commercial lecithin, comprising dissolving lecithin in absolute ethanol and treating the alcohol solution with a tertiary amine anion-exchange resin in the free base form.

References Cited in the file of this patent

Robinson et al.: Ind. Eng. Chem. 41, 2221–224 (1949).
Chemical Abstracts 46, 4251[1] (1952).